(12) United States Patent
Duhig

(10) Patent No.: US 8,856,684 B2
(45) Date of Patent: Oct. 7, 2014

(54) SCROLLING INTERFACE

(75) Inventor: Jonathan Anthony Duhig, Scotland Island (AU)

(73) Assignee: Canon Kabushiki Kaisha, Tokyo (JP)

( * ) Notice: Subject to any disclaimer, the term of this patent is extended or adjusted under 35 U.S.C. 154(b) by 907 days.

(21) Appl. No.: 11/952,664

(22) Filed: Dec. 7, 2007

(65) Prior Publication Data
US 2008/0155475 A1 Jun. 26, 2008

(30) Foreign Application Priority Data
Dec. 21, 2006 (AU) ................................ 2006252191

(51) Int. Cl.
G06F 3/048 (2013.01)
H04N 5/445 (2011.01)
G06F 3/0485 (2013.01)
G06F 3/0482 (2013.01)

(52) U.S. Cl.
CPC .............. G06F 3/0485 (2013.01); H04N 5/445 (2013.01); G06F 3/0482 (2013.01)
USPC ........................................................ 715/830

(58) Field of Classification Search
CPC .............................. G06F 3/0482; H04N 5/445
USPC .................. 715/784–787, 830–839
See application file for complete search history.

(56) References Cited

U.S. PATENT DOCUMENTS

| | | | |
|---|---|---|---|
| 5,202,961 A | 4/1993 | Mills et al. | 395/159 |
| 5,434,591 A * | 7/1995 | Goto et al. | 345/688 |
| 5,452,413 A * | 9/1995 | Blades | 715/786 |
| 5,495,566 A | 2/1996 | Kwatinetz | 395/157 |
| 5,530,455 A * | 6/1996 | Gillick et al. | 345/163 |
| 5,623,588 A | 4/1997 | Gould | 395/326 |
| 5,760,767 A | 6/1998 | Shore et al. | 345/328 |
| 5,774,109 A * | 6/1998 | Winksy et al. | 345/685 |
| 5,801,702 A | 9/1998 | Dolan et al. | 345/357 |
| 5,936,618 A * | 8/1999 | Spiero et al. | 345/204 |
| 5,943,679 A | 8/1999 | Niles et al. | 707/526 |
| 6,097,371 A * | 8/2000 | Siddiqui et al. | 345/164 |
| 6,121,966 A | 9/2000 | Teodosio et al. | 345/346 |
| 6,154,205 A * | 11/2000 | Carroll et al. | 345/684 |
| 6,252,597 B1 | 6/2001 | Lokuge | 345/353 |
| 6,262,724 B1 * | 7/2001 | Crow et al. | 715/723 |

(Continued)

FOREIGN PATENT DOCUMENTS

| | | | |
|---|---|---|---|
| EP | 0 813 138 A1 | 6/1997 | .............. G06F 3/023 |
| EP | 1 239 672 A2 | 9/2002 | |

(Continued)

Primary Examiner — Tuyetlien Tran
Assistant Examiner — Patrick Fasang
(74) Attorney, Agent, or Firm — Fitzpatrick, Cella, Harper & Scinto

(57) ABSTRACT

Disclosed is a method of browsing a set of items on a display device. The method displays a plurality of items (303-307) of the set on a display device in a first arrangement (FIG. 3A) for browsing. Scrolling of the items can then occur in the first arrangement by responding to user action on a user actuable control (105, 602, 603). The method further detects a predetermined characteristic (eg. time) of the user action on the user actuable control and, upon detecting the predetermined characteristic, displays the items in a second arrangement (FIG. 3B) for scrolling wherein the items (308, 309) in the second arrangement are positioned in a different spatial relationship relative to each other from the first arrangement.

17 Claims, 16 Drawing Sheets

(56) References Cited

U.S. PATENT DOCUMENTS

| | | | |
|---|---|---|---|
| 6,613,100 B2 | 9/2003 | Miller | 715/526 |
| 6,725,427 B2 | 4/2004 | Freeman et al. | 715/526 |
| 6,738,045 B2* | 5/2004 | Hinckley et al. | 345/163 |
| 6,747,680 B1* | 6/2004 | Igarashi et al. | 715/784 |
| 6,909,443 B1 | 6/2005 | Robertson et al. | 345/782 |
| 6,971,121 B2 | 11/2005 | West et al. | 725/142 |
| 6,976,229 B1 | 12/2005 | Balabanovic et al. | 715/838 |
| 7,051,291 B2* | 5/2006 | Sciammarella et al. | 715/838 |
| 7,107,532 B1* | 9/2006 | Billmaier et al. | 715/720 |
| 7,119,819 B1 | 10/2006 | Robertson et al. | 345/782 |
| 7,152,209 B2 | 12/2006 | Jojic et al. | 715/720 |
| 7,383,503 B2 | 6/2008 | Banks | 715/273 |
| 7,548,936 B2 | 6/2009 | Liu et al. | 707/104.1 |
| 7,664,739 B2* | 2/2010 | Farago et al. | 707/722 |
| 7,681,141 B2 | 3/2010 | Tu | 715/784 |
| 7,698,654 B2 | 4/2010 | Fong et al. | 715/810 |
| 7,707,137 B2 | 4/2010 | Nazarian et al. | 707/1 |
| 7,735,104 B2 | 6/2010 | Dow et al. | 725/52 |
| 7,797,641 B2 | 9/2010 | Karukka et al. | 715/802 |
| 7,810,046 B2 | 10/2010 | Hiraoka et al. | 715/810 |
| 7,814,436 B2 | 10/2010 | Schrag et al. | 715/851 |
| 8,112,711 B2 | 2/2012 | Ackley | 715/716 |
| 2001/0012023 A1 | 8/2001 | Kobayashi | 715/835 |
| 2002/0033848 A1* | 3/2002 | Sciammarella et al. | 345/838 |
| 2002/0054059 A1 | 5/2002 | Schneiderman | 345/700 |
| 2002/0118169 A1* | 8/2002 | Hinckley et al. | 345/163 |
| 2003/0033296 A1 | 2/2003 | Rothmuller et al. | 707/3 |
| 2003/0128228 A1 | 7/2003 | Crow et al. | 345/716 |
| 2003/0218637 A1 | 11/2003 | Sloo et al. | 345/810 |
| 2004/0021694 A1* | 2/2004 | Doar | 345/784 |
| 2004/0100479 A1* | 5/2004 | Nakano et al. | 345/700 |
| 2004/0153446 A1 | 8/2004 | Castronova | 707/3 |
| 2004/0160458 A1* | 8/2004 | Igarashi et al. | 345/660 |
| 2005/0010953 A1 | 1/2005 | Carney et al. | 725/61 |
| 2005/0091596 A1 | 4/2005 | Anthony et al. | 715/712 |
| 2005/0091597 A1 | 4/2005 | Ackley | 715/716 |
| 2005/0102610 A1 | 5/2005 | Jie | 715/513 |
| 2005/0160375 A1 | 7/2005 | Sciammarella et al. | 715/838 |
| 2005/0187976 A1 | 8/2005 | Goodman et al. | 707/104.1 |
| 2005/0206658 A1* | 9/2005 | Fagans | 345/660 |
| 2005/0251748 A1 | 11/2005 | Gusmorino et al. | 715/713 |
| 2005/0251760 A1* | 11/2005 | Sato et al. | 715/856 |
| 2005/0257166 A1 | 11/2005 | Tu | 715/787 |
| 2005/0270294 A1 | 12/2005 | Le Tuan | 345/473 |
| 2005/0278656 A1* | 12/2005 | Goldthwaite et al. | 715/810 |
| 2006/0117356 A1 | 6/2006 | Jojic et al. | 725/88 |
| 2006/0236362 A1 | 10/2006 | Istvan et al. | 725/135 |
| 2006/0271870 A1* | 11/2006 | Anwar | 715/764 |
| 2007/0136286 A1 | 6/2007 | Webster et al. | 707/7 |
| 2007/0162853 A1 | 7/2007 | Weber et al. | 715/719 |
| 2007/0198476 A1* | 8/2007 | Farago et al. | 707/3 |
| 2007/0204238 A1 | 8/2007 | Hua et al. | 715/838 |
| 2007/0226646 A1* | 9/2007 | Nagiyama et al. | 715/784 |
| 2008/0062141 A1 | 3/2008 | Chandhri | 345/173 |
| 2008/0066013 A1 | 3/2008 | Brodersen et al. | 715/836 |
| 2008/0066016 A1 | 3/2008 | Dowdy et al. | 715/854 |
| 2008/0122870 A1 | 5/2008 | Brodersen et al. | 345/634 |
| 2008/0148152 A1 | 6/2008 | Blinnikka et al. | 715/719 |
| 2008/0150892 A1 | 6/2008 | Duhig et al. | 345/156 |
| 2008/0155473 A1 | 6/2008 | Duhig | 715/818 |
| 2008/0155474 A1 | 6/2008 | Duhig | 715/830 |
| 2008/0158261 A1 | 7/2008 | Gould | 345/666 |
| 2008/0313214 A1 | 12/2008 | Duhig et al. | 707/102 |
| 2009/0013280 A1 | 1/2009 | Ballard | 715/783 |
| 2009/0070710 A1* | 3/2009 | Kagaya et al. | 715/810 |
| 2009/0100373 A1 | 4/2009 | Pixley et al. | 715/786 |
| 2009/0219304 A1* | 9/2009 | Martin et al. | 345/634 |
| 2009/0327891 A1 | 12/2009 | Holm et al. | 715/716 |
| 2010/0175026 A1 | 7/2010 | Bortner et al. | 715/818 |
| 2010/0333025 A1 | 12/2010 | Roberts | 715/823 |

FOREIGN PATENT DOCUMENTS

| | | | |
|---|---|---|---|
| EP | 1 667 013 A2 | 11/2005 | G06F 3/048 |
| WO | WO 01/29702 A2 | 4/2001 | |
| WO | WO 02/17060 A1 | 2/2002 | |

* cited by examiner

SCROLLING INTERFACE

CROSS-REFERENCE TO RELATED PATENT APPLICATIONS

This application claims the right of priority under 35 U.S.C. §119 based on Australian Patent Application No. 2006252191, filed Dec. 21, 2006, which is incorporated by reference herein in its entirety as if fully set forth herein.

FIELD OF INVENTION

The present invention relates to the presentation of items, such as audiovisual items, in a computerised collection and, in particular, to a method of scrolling such items in an efficient and effective manner.

BACKGROUND

With the advent and huge popularity of image scanners, video capture cards and digital still and video cameras, it is common for people to store a large number of photographs and other documents on personal computers and other computer related devices. There is a need for users of these devices to be able to access and navigate through their documents to view items and to visually search for items.

Modern computing systems often provide a variety of methods for viewing large collections of documents which can be controlled by computer interface control devices including a mouse and pointer, and also by keyboard input, or other physical controls such as scroll wheels, as found on some mouse devices. The methods generally provide a means to select a location within a storage structure and return the set of items within that location or to return a set of items matching a certain query. A viewing area is then used to display representations of items from the set, typically in a sequence. For large sets it is common that only a limited number of the items in the set are be viewed in the viewing area at any one time. The user can use the mouse and pointer or other input control device to execute commands which move items through the viewing area so that items earlier or later in the sequence are displayed. The action of visually moving items through or past a display area is herein referred to as "scrolling". The action of controlling scrolling for the purpose of exploring a set is herein referred to as "browsing". These terms are widely known in the art according to these general definitions.

It is common for computer programs to provide means for the user to adapt the proportions of the viewing area such that more or less items of the set can be viewed at any one time. The controls used to adapt the proportions of the viewing area are separate from the controls used to control the scrolling of items. In some configurations this means that the sequence of items can be arranged in a number or rows and columns. Changing the proportions of the viewing area while maintaining the same size of representation for each item means that the number of rows or columns can also change. The user can choose which configuration is most effective for their current task. For example, when scanning a varied collection for a distinct item, a large number of rows and columns may be most suitable to scan the collection as fast as possible. For a task such as scanning for an item within many similar items, it may be better to have fewer rows or columns so that it is easier for the user to pay close attention to displayed representations of items as they are scrolled through the viewing area.

Another approach to provide for scanning and also for close inspection is to distort the proportions of individual items when they are selected for close inspection so that they are shown much larger, and the adjacent items are either occluded or compressed (reduced) in size. These interfaces may also include a scrolling ability.

Devices such as computer game systems and digital video players also often provide methods wherein the user can control a set of items which can be moved through a viewing area using handheld controls. These types of devices do not usually include mouse or keyboard input controls such as those typically associated with stand-alone personal computer systems. These devices typically do not have the ability to change the proportions of the viewing area with the same freedom as with a personal computer system. This lack of freedom allows for the use of a simpler control system which is better suited to the types of handheld controllers these devices use. These devices also tend to have smaller collections to view and therefore need only offer a less flexible system that is easier to control, is more efficient and generally more satisfying for the user.

Accordingly, systems for scrolling through sets of items can demand different configurations for different situations. ISO9241 defines the usability of a system as comprising the efficiency, effectiveness and satisfaction which a user experiences when interacting with the system. The prior art described demonstrates that efficiency, effectiveness and satisfaction for a scrolling interface can be affected by the configuration chosen related to the device used.

Recently, some personal computer systems have been adapted to provide for display using a standard television set and control using a relatively simple remote control unit, akin to those commonly associated with television sets. This leads to large collections being accessed with simple input devices. There is a need for users to be able to scroll large collections with simple input controls with an acceptable level of effectiveness, efficiency and satisfaction.

SUMMARY

In accordance with one aspect of the present invention there is disclosed a method of browsing a set of items on a display device, the method comprising the steps of:
  displaying a plurality of items of the set on a display device in a first arrangement for browsing;
  scrolling the items in the first arrangement by responding to user action on a user actuable control; and
  detecting a predetermined characteristic of the user action on the user actuable control and, upon detecting the predetermined characteristic, displaying the items in a second arrangement for scrolling wherein the items in the second arrangement are positioned in a different spatial relationship relative to each other from the first arrangement.

Generally, the predetermined characteristic of user action comprises a continuous or continued actuation of the user actuable control. Alternatively, the predetermined characteristic may comprise a continuous actuation for a predetermined period of time of the user actuable control. The predetermined characteristic of user action may be is selected from the group consisting of repeated instances of the user action; repeated instances of the user action within a predetermined period of time; repeated instances of the user action followed by a pause of a predetermined amount of time; a changed intensity of the user action; and cessation of the user action. The changed intensity of the user action may be selected from the group consisting of a speed of rotation of the user actuable control, an amount of force applied to the user actuable control, and a proximity associated with the user actuable control.

The first arrangement may comprise at least one row of the items and the second arrangement has a different number of rows than the first arrangement. The first arrangement may comprise at least one column of the items the second arrangement has a different number of columns than the first arrangement. The second arrangement has a different flow rate of the items than the first arrangement, preferably higher.

Desirably the size of the viewing window can increase with continuous or continued actuation of the user actuable control and the size decreases with cessation of such actuation. The browsing typically comprises scrolling of the items displayed by the display device, the scrolling resulting from the user action on the user actuable control.

Other aspects of the present invention are also disclosed.

BRIEF DESCRIPTION OF THE DRAWINGS

Some aspects of the prior art and at least one embodiment of the present invention with now be described with reference to the drawings in which.

DETAILED DESCRIPTION INCLUDING BEST MODE

Disclosed is a method for browsing a collection of items stored in a digital system. The items may include images (such as bitmap or graphic), sounds (such as speech, music or songs), video (such as movies or animations), documents or data records, to name but a few. The actual storage of such collections of items in digital systems is well known. Items are typically stored in a hierarchical file system or a database structure on a storage medium such as a hard disk, optical disk or random access memory (RAM). Such storage may be accessible via a computer or communications network.

The methods of browsing a collection of data files or items to be described may be practiced using a general-purpose computer system 600, such as that shown in FIG. 6 wherein the processes to be described with reference to the remaining figures may be implemented as software, such as an application program executing within the computer system 600. In particular, the steps of the browsing methods are effected by instructions in the software that are carried out by the computer. The instructions may be formed as one or more code modules, each for performing one or more particular tasks. The software may also be divided into two separate parts, in which a first part performs the actual browsing and searching methods, and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for browsing a collection of data items.

Figure 6:
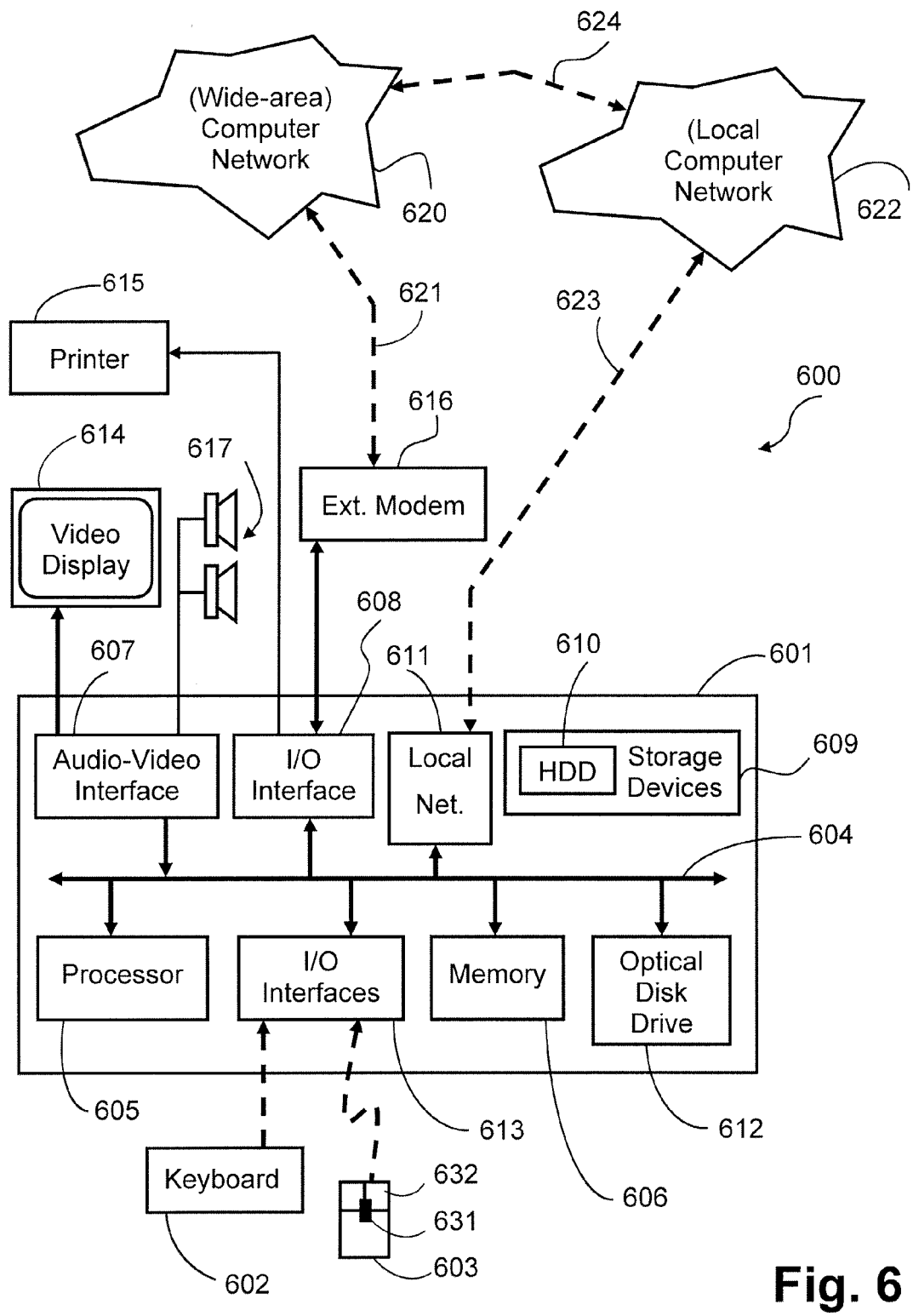
FIG. 6 is a schematic block diagram representation of a computer system in which the described arrangements may be practiced.

As seen in FIG. 6, the computer system 600 is formed by a computer module 601, input devices such as a keyboard 602 and a mouse pointer device 603, and output devices including a printer 615, a display device 614 and loudspeakers 617. An external Modulator-Demodulator (Modem) transceiver device 616 may be used by the computer module 601 for communicating to and from a communications network 620 via a connection 621. The network 620 may be a wide-area network (WAN), such as the Internet or a private WAN. Where the connection 621 is a telephone line, the modem 616 may be a traditional "dial-up" modem. Alternatively, where the connection 621 is a high capacity (eg: cable) connection, the modem 616 may be a broadband modem. A wireless modem may also be used for wireless connection to the network 620.

The computer module 601 typically includes at least one processor unit 605, and a memory unit 606 for example formed from semiconductor random access memory (RAM) and read only memory (ROM). The module 601 also includes an number of input/output (I/O) interfaces including an audio-video interface 607 that couples to the video display 614 and loudspeakers 617, an I/O interface 613 for the keyboard 602 and mouse 603 and optionally a joystick (not illustrated), and an interface 608 for the external modem 616 and printer 615. In some implementations, the modem 616 may be incorporated within the computer module 601, for example within the interface 608. The computer module 601 also has a local network interface 611 which, via a connection 623, permits coupling of the computer system 600 to a local computer network 622, known as a Local Area Network (LAN). As also illustrated, the local network 622 may also couple to the wide network 620 via a connection 624, which would typically include a so-called "firewall" device or similar functionality. The interface 611 may be formed by an Ethernet™ circuit card, a wireless Bluetooth or an IEEE 802.11 wireless arrangement. The keyboard 602 and the mouse 603 may be coupled to the computer module 601 by corresponding wired connections, or using wireless connections, such as radio frequency or infra-red connections, as illustrated by the corresponding dashed lines in FIG. 6.

The interfaces 608 and 613 may afford both serial and parallel connectivity, the former typically being implemented according to the Universal Serial Bus (USB) standards and having corresponding USB connectors (not illustrated). Storage devices 609 are provided and typically include a hard disk drive (HDD) 610. Other devices such as a floppy disk drive and a magnetic tape drive (not illustrated) may also be used. An optical disk drive 612 is typically provided to act as a non-volatile source of data. Portable memory devices, such optical disks (eg: CD-ROM, DVD), USB-RAM, and floppy disks for example may then be used as appropriate sources of data to the system 600.

The components 605, to 613 of the computer module 601 typically communicate via an interconnected bus 604 and in a manner which results in a conventional mode of operation of the computer system 600 known to those in the relevant art. Examples of computers on which the described arrangements can be practised include IBM-PC's and compatibles, Sun Sparcstations, Apple Mac™ or alike computer systems evolved therefrom.

Typically, the application programs discussed above are resident on the hard disk drive 610 and read and controlled in execution by the processor 605. Intermediate storage of such programs and any data fetched from the networks 620 and 622 may be accomplished using the semiconductor memory 606, possibly in concert with the hard disk drive 610. In some instances, the application programs may be supplied to the user encoded on one or more CD-ROM and read via the corresponding drive 612, or alternatively may be read by the user from the networks 620 or 622. Still further, the software can also be loaded into the computer system 600 from other computer readable media. The term "computer readable storage media" refers to any storage medium that participates in providing instructions and/or data to the computer system 600 for execution and/or processing. Examples of such storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 614. Through manipulation of the keyboard 602 and the mouse 603, a user of the computer system 600 and the application may manipulate the interface to provide controlling commands and/or input to the applications associated with the GUI(s). Generally the GUIs include icons or regions that, when appropriately selected using either or both of the keyboard 602 and mouse 603, provide for user control of the application program to achieve a desired function. Particularly, the mouse 603 typically affords two-dimensional positioning within a GUI and selection at a determinable location via user actuable switches 632 formed therein. In some instances the mouse 603 includes a scroll wheel 631 which, which actuated by the user, permits content within the GUI to be scrolled.

Whilst the computer system 600 may be used to implement the browsing arrangements to be described, such may also be configured in more specific user devices of smaller size or limited application. Such specific user devices include, but are not limited to, portable/personal audio and/or video reproduction devices, for example utilizing MP3 or MPEG file formats.

Figure 1:
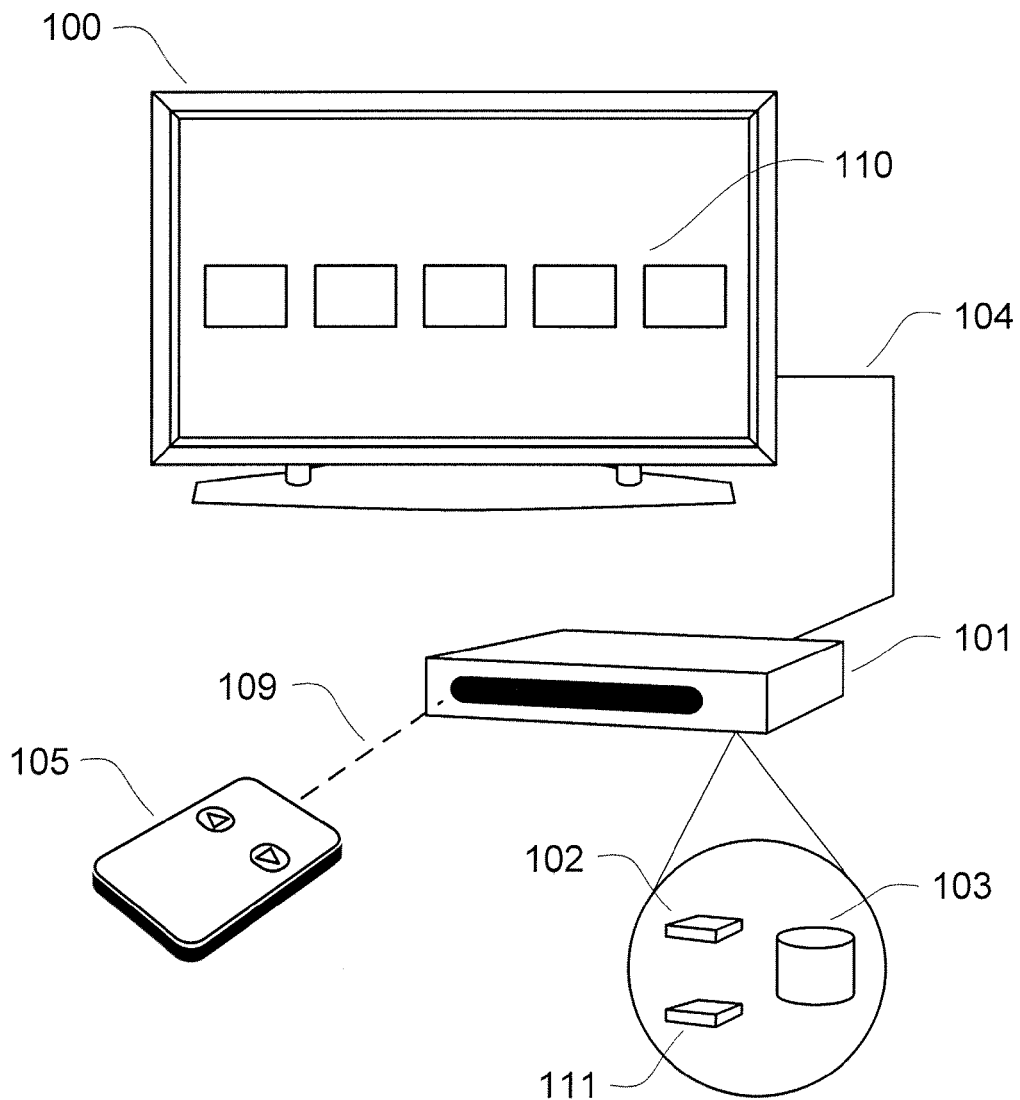
FIG. 1 is a system diagram showing a typical digital system for the reproduction of data items within which the arrangements of the present disclosure may be implemented.

FIG. 1 shows a digital system having a display 100 connected to a media device 101 by a connector 104. This connector may use wires or be wireless using radio or infrared signal. The media device 101 comprises at least a Central Processing Unit (CPU) 102 and a data storage system 103, typically configured in a manner akin to corresponding components of the computer 601 of FIG. 6 described above. The media device 101 may be a dedicated reproduction device, a device with additional capabilities such as a TV tuner, a set-top box, or a DVD player, or may be a general purpose Personal Computer (PC). The media device 101 may additionally contain a Graphics Processing Unit (GPU) 111 which is configured to assist in the rendering of a graphical user interface 110 to the display 100. The GPU 111 may support the execution of graphics libraries such as OpenGL, a registered trade mark of certain products manufactured by Silicon Graphics, Inc of U.S.A. The data storage system 103 typically stores a plurality of items represented in digital form. Alternatively, in network configured arrangements, such as a CATV set-top box arrangement, the device 101 may provide access via the network to the stored items.

An application program operating in accordance with the present disclosure and executed by the CPU 102, optionally assisted by the GPU 111, causes the user interface 110 to be rendered upon the display 100.

A control device 105, illustrated as a hand-portable remote control, is operable by a user to transmit a signal 109 to the media device 101, wherein the signal is received by the CPU 102 and causes control events to occur which may result in changes to the state of the digital system and to the user interface 110 represented upon the display 100. The signal 109 may be an infra-red signal or a radio signal or alternatively the control device 105 may also be connected by one or more wires or may be integrated into the media device 101. The control device 105 may alternatively be a standard input device such as a keyboard or mouse, akin to those described above.

In some implementations, the Central Processing Unit (CPU) 102, the optional Graphics Processing Unit (GPU) 111 and the data storage system 103 may be contained directly within the chassis of the display 100, thereby eliminating the need for the media device 101 and the connector 104. In other implementation, the display 100 may be portable. Further, the functional components of the device 101 may be included in a device with additional capabilities, for example a digital camera, with the user interface 110 being rendered either on a display which is integrated into the device, or on an external display. Some components and user controls may be shared between the browsing application and any additional capabilities of the device.

Figure 2A:
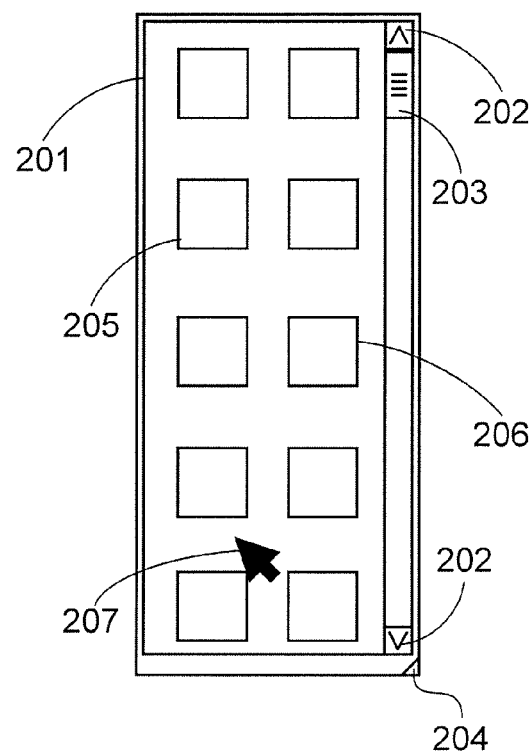
FIGS. 2A and 2B are examples of a prior art presentations allowing control of the proportions of a viewing window and the subsequent arrangement of items presented.
Figure 2B:
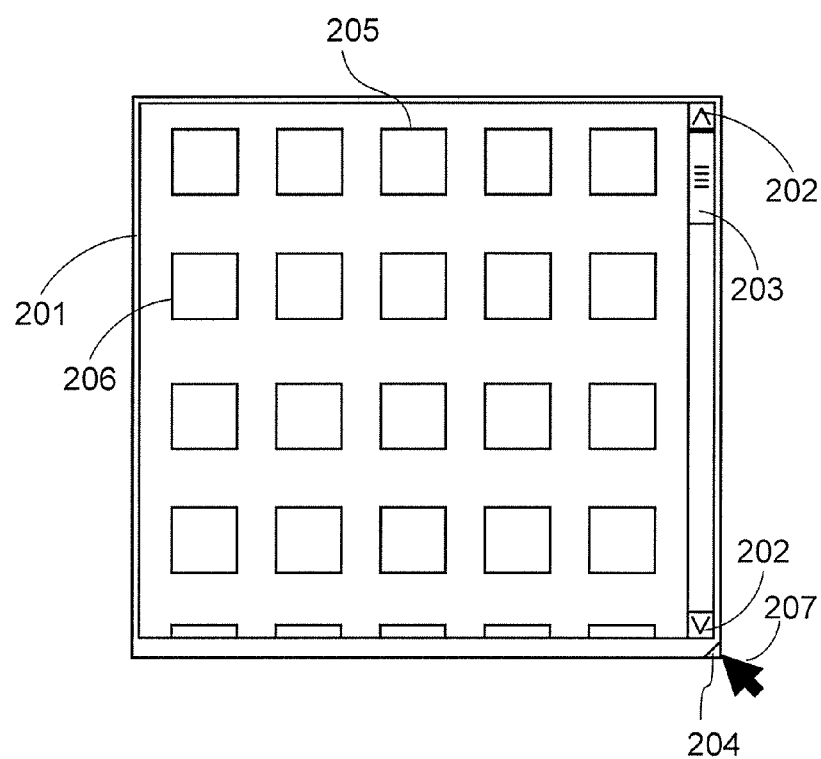

FIG. 2A shows a prior art user interface arrangement, often used in desktop computer systems, wherein items, for example items 205 and 206, are displayed in a viewing area 201. Scrolling of the items in the viewing area 201 may be effected, for example where the mouse 603 includes the scroll wheel 632, through simple manual actuation of the scroll wheel 632. Similar scrolling may be performed by actuation of an "arrow" button on the keyboard 602. Alternatively, the user can operate virtual controls 202 or 203 using a user input device such as the mouse 603 to perform scrolling. The virtual controls include buttons 202 that can be selected to scroll the items vertically and so-called 'thumb bars' 203 that can be used to control scrolling in another manner. Selection is performed by positioning a cursor 207 over the corresponding virtual control 202-204 by manually moving the mouse 603 and actuating the switch 632 upon the mouse 603 when the cursor 207 is so-positioned. A further (separate) virtual control 204 is often provided to permit adjustment of the proportions of the viewing area 201 and hence the relative spatial arrangement of the items displayed in the viewing area 201. FIG. 2B shows the same interface as FIG. 2A however with the viewing area 201 adjusted using control 204 such that the items 205 and 206 are positioned in a different relative spatial arrangement relative to each other. In view of the size of the viewing area 201 being increased, a larger number of the items in the collection are able to be represented in FIG. 2B. When in the configuration of FIG. 2B, the collection may again be scrolled in the ways discussed above.

Other controls are often provided to adjust the display of items including the ability to change the size of the items and the way in which items are displayed in the viewing area. These controls, such as menus and buttons, are separate from the controls which control the scrolling of items through the viewing area 201.

A single "user actuable control" is hereafter to be understood as a single physical or virtual control as described above. Some user actuable controls are configured such that the physical control on the physical device is mapped to the actuation of the same function every time the control is actuated—for example a button on a remote control that affects the volume of a television set. In other configurations the physical control such as a button 632 on a mouse 603 actuates one of many functions dependent on the position of the pointer 207 displayed on the display 614. The virtual object that corresponds with the virtual pointer 207 controlled by the physical device 603 is the factor that determines which function is actuated by the physical button 632. The "user actuable control" is formed by the combination of the virtual control (e.g. an on-screen button 202) and the virtual actuator (e.g. a pointer 207) and the physical device which controls the virtual activator (e.g. a mouse 603 and mouse button 632). This is well understood in the field. Other configurations may have physical devices which actuate a different function for different modes of an application. It is well understood that a single physical control activated in a given context constitutes a single actuable control.

It is also possible for operators of devices to actuate controls using a variety of different activation styles which can be different for different types of user actuable control. For example, for a user actuable control which is a single physical device mapped to a single function, it is possible for the user to activate the control once or repeatedly within a set period of time. The same is true for a virtual button activated by a pointer under the control of a physical device such as a mouse. However, activating a different function by changing the mode of the application or changing the virtual control which the pointer correlates with does not constitute a different style of activation. Rather, such constitutes the activation of a different user actuable control. This is clearly understood by those familiar with information systems and modern technologies.

It will be appreciated therefore that in the prior art arrangements of FIGS. 2A and 2B, the variation in the representation of the items of the collection between FIGS. 2A and 2B, including the number of represented items, arises from the operation of two different user actual controls. The scrolling operation depicted in FIG. 2A may be performed using a single user actuable control, such as that effected through coincident manipulation of the mouse 603, the pointer 207 and the virtual button 202, for example. The change in size of the display window 201 between FIG. 2A and FIG. 2B is effected using another single user actuable control, in this case effected through coincident manipulation of the mouse 603, the pointer 207 and the virtual control 204. This is well known as "click and drag" operation to define the modified viewing window 201 of FIG. 2B. Once in the configuration of FIG. 2B, the different single user actuable control described above for scrolling may again be used.

Figure 3A:
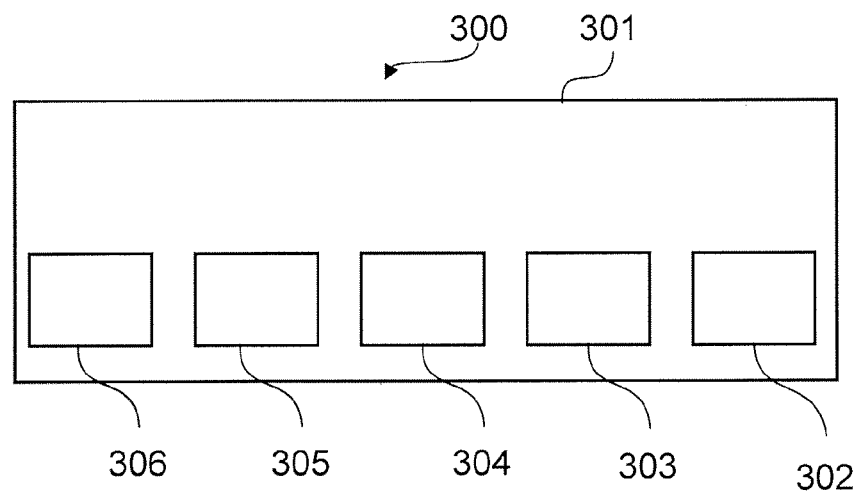
FIGS. 3A-3D are examples of a first interface of the present disclosure at different stages of scrolling.
Figure 3B:
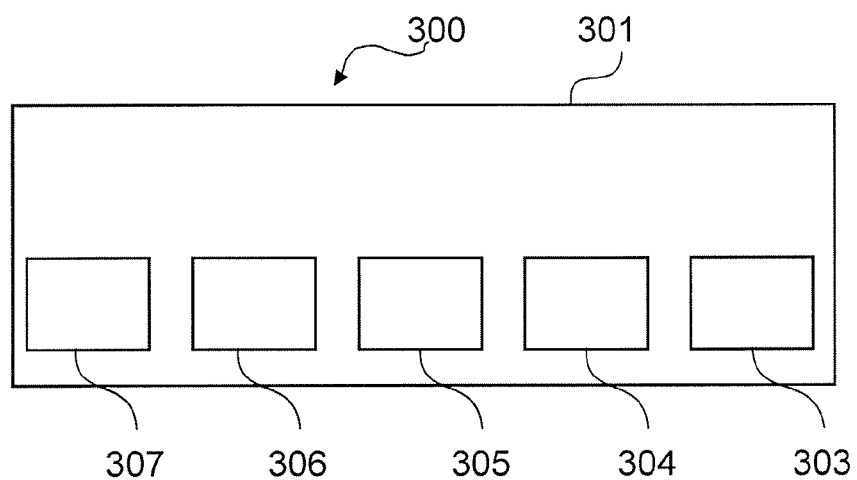

In a first interface 300 according to the present disclosure, items of a collection are organised as a serial sequence which can be scrolled through a viewing area. In this first interface, the items are initially stationary, however other interfaces or implementations may begin with a moving or scrolling set of items. FIG. 3A shows an initial display for the first interface 300 with a viewing area 301 and a set of items 302 to 306, with an item 304 occupying a central position within the viewing area 301. The user can provide input via a single control such as via actuation of a physical button (of the keyboard 602, or switch 632 of the mouse 603) or potentiometer (associated with a scroll wheel 631 for example) on a remote control device, or by operating an on-screen virtual control using a selection method controlled by an input device such as the mouse 603 and associated cursor control 207. Different methods to provide such input from a single physical or virtual control based upon a user action are well known and need not be described further in the present description. In the example described here the input provided by the user by activating the control operates to scroll the items from left to right to give the configuration as shown in FIG. 3B, such that item 305 becomes the centre item, item 302 is no longer visible and item 307 becomes visible. Scrolling could similarly occur from right to left. The scrolling can continue automatically until an input is received to stop the scrolling, or alternatively the scrolling may continue only with continuous or repeated inputs by the user on the same control. Such continuous or repeated instances of input may include maintaining the mouse switch 632 continuously depressed or by repeated clicking of the mouse switch 632. Alternatively such may involve simple positioning of the cursor 207 above an appropriate iconic virtual switch, perhaps without a need to "click" the corresponding mouse switch 632.

Figure 3C:
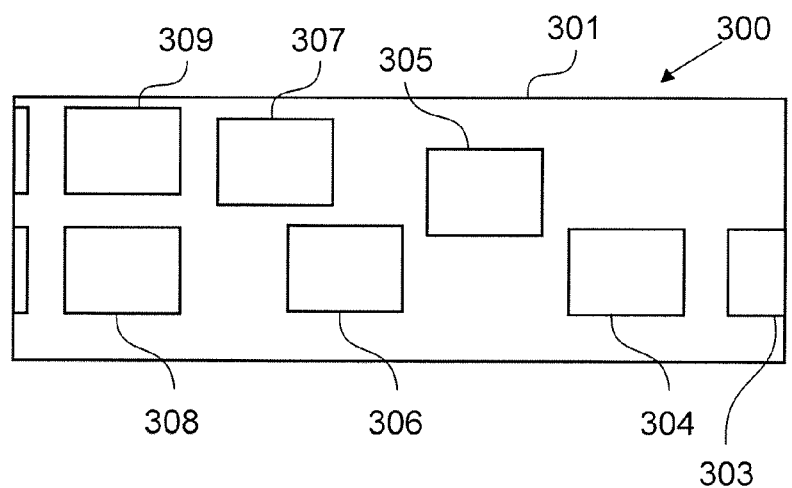
Figure 3D:
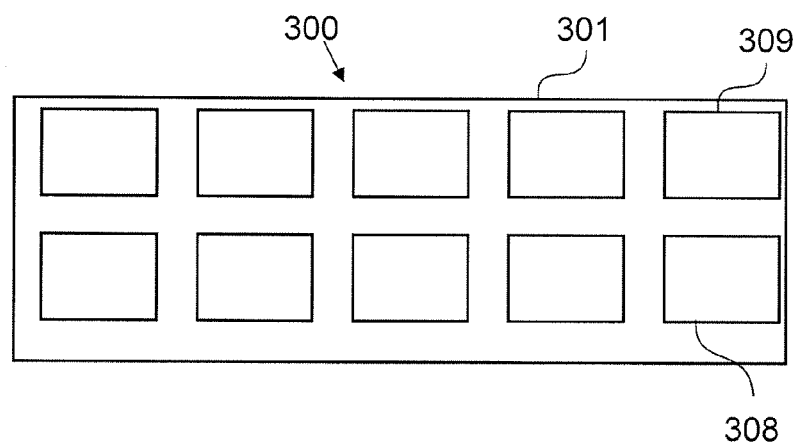

The interface 300 further adapts and augments this scrolling behaviour by detecting and responding to a predetermined activation characteristic of the control by changing the configuration of items in the interface 300 automatically from a low bandwidth scrolling presentation, such as a single row of scrolling items as shown in FIG. 3A, to a higher bandwidth scrolling presentation, such as two rows of scrolling items as shown in FIG. 3D, whilst maintaining the same scrolling speed. When the input from activation of the control of the interface 300 matches predetermined characteristics, the items change from a serial presentation, as in FIG. 3B, to a parallel presentation, as in FIG. 3D. For example, in FIG. 3B items 305 and 306 are presented side-by-side, whereas in FIG. 3D items 308 and 309 are presented in a different relative spatial arrangement such they are aligned vertically with item 309 which is placed above item 308. This adaptation allows the user to scroll through more of the collection in a shorter time without a need to increase the scrolling speed. Significantly, relative to the same size of the viewing window 301, the second arrangement of FIG. 3D presents items in the collection at a different flow rate to that of the first arrangement. As such, for the same scrolling speed, the arrangement of FIG. 3D affords double the flow rate or bandwidth of items as does the arrangement of FIG. 3A.

In specific contrast to the arrangements described above with reference to FIGS. 2A and 2B, according to the present disclosure, actuation or operation of the described control for the interface 300 causes not only scrolling of the items in the collection, but also a change in the configuration of the representation of the items in the collection. Here, the change is effected by user operational of a single user actuable control. Further, in FIGS. 2A and 2B whilst scrolling could be performed via actuation of a single user actuable control (eg. via manipulation of a scroll wheel or a key), the change in configuration between FIG. 2A and FIG. 2B required operation of a different single user actuable control.

The above described adaptation of FIGS. 3A to 3D can be configured to apply only to items which become visible after the change has been triggered or alternatively by animating items within the viewing area during the scrolling action. FIG. 3C shows a stage in such an animation where items 305, 306 and 307 have moved from their relative positions shown in FIG. 3B to relative positions intermediate between the serial arrangement in FIG. 3B to the parallel arrangement in FIG. 3D. This movement occurs in addition to the lateral scrolling motion of the items. As the items continue to scroll from left to right in the parallel arrangement, items 308 and 309 move across the viewing area 301 as shown in FIG. 3D and subsequent items continue to be displayed in the parallel arrangement.

The change in flow rate of presentation of items may be further achieved or enhanced by altering the actual representation size of each item. For example, where the items are thumbnail images and the viewing window is a strip having a size is that is fixed, the first arrangement may present only a single row of thumbnails each substantially occupying the height of the viewing window. In order to display a second row of items in a second arrangement, the thumbnail images of this example may be scaled in size by 50% so that the second row may fit within the viewing window. In some image databases, multiple thumbnail sizes may be available and such may entail changing the selection of thumbnail size upon transition from the first to the second arrangement and vice versa.

The input characteristics required from a single control to initiate the change in presentation of the interface 300 can be varied depending on the characteristics of the particular implementation and in some instances upon the nature of the collection being browsed. In one implementation, the control may be configured to be activated once to initiate scrolling in the first arrangement and, after a predetermined period of time, the presentation is then changed to the second arrangement. The period of time may be varied for different applications and interfaces. For image browsing, such may be a period for example between 1 and 10 seconds. In another implementation, the control may be configured to require continued activation by the user. For example, this may involve the user holding a button down, or holding a joystick to one direction, to firstly accelerate the scrolling, and then, after a predetermined period of time, or at a predetermined scrolling speed, whilst the control continues to be activated, the scrolling items are then adapted to the second arrangement. Another implementation can be configured to require the user to repeatedly activate the control to adapt the presentation to the second arrangement. Yet another implementation may be configured to require the user to increase the intensity of activation of a control. This may be achieved for example by altering a speed of rotation by rotating a scroll wheel faster, or by applying more force to a control, or by increasing a distance on a virtual control which is mapped to an intensity variable (ie. a proximity variation). Another implementation may involve detecting repeated instances of the user action followed by a pause of a predetermined period of time. Different controls have different methods by which the same can be activated. Some control units may be activated using a single user control input, but may involve multiple switches to convert the user activation to a desired control input. For the purposes of the present disclosure, from the foregoing, it will be appreciated that whilst there are many ways to retrieve input from user action, the concept of a single control referred to herein is that which is dependent upon a single user actuation or operation in a predetermined manner. The control manages the scrolling behaviour of the collection of items and the predetermined activation characteristic is determined from the control to manage the arrangement of the scrolling list. Further the aforementioned modes of actuation of the control may be considered a group and specific implementation may select one or more or a combination of the different modes of actuation.

Although the interface 300 shows adaptation from a single row of scrolling items to a double row of scrolling items, many alternative implementations are possible within the spirit of the present disclosure whereby more items can be viewed in a shorter period of time whilst remaining under the maximum visual scrolling speed chosen for the application.

Figure 4A:
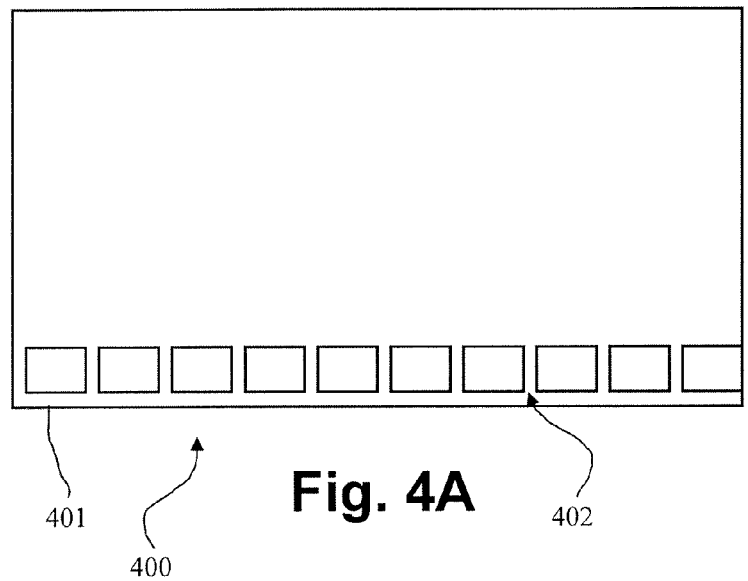
FIGS. 4A-4E are examples of a second interface according to the present disclosure and different stages of browsing.
Figure 4B:
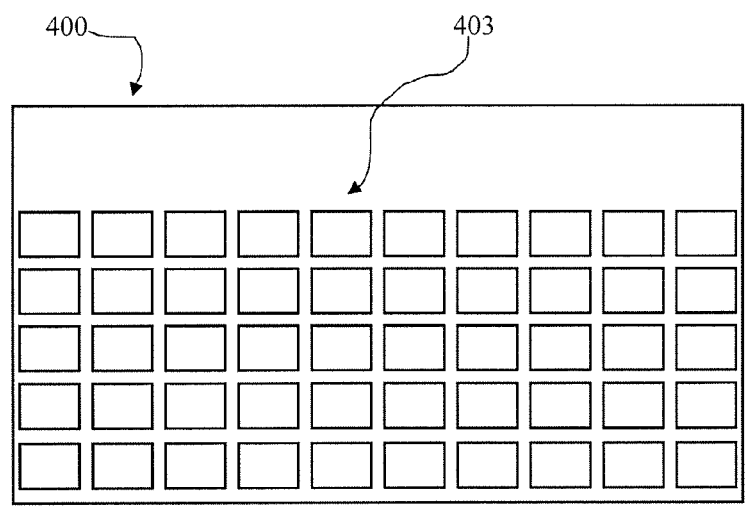
Figure 4C:
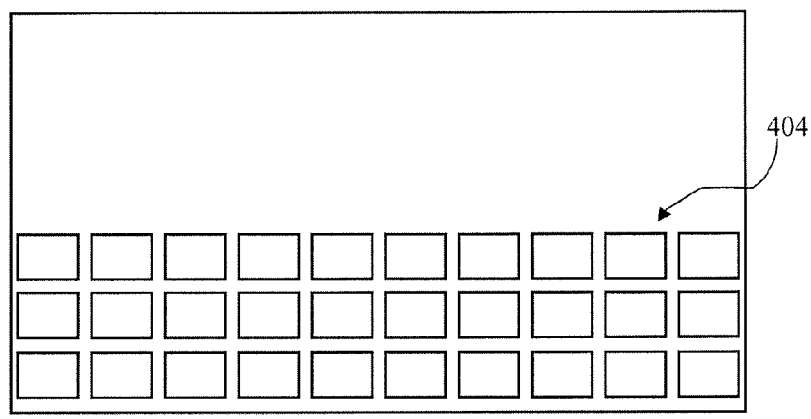

For example, FIG. 4A shows an interface 400 having a viewing area 401 and a single row 402 of items. The interface 400 is configured to adapt to five rows 403 of items as shown in FIG. 4B following user inputs conforming to a chosen activation characteristic. The adaptation of the interface 400 can be configured to occur in stages wherein the separation is based on time, or based on the activation characteristic of the control. Similarly another implementation may initially arrange the items in three rows 404, as shown in FIG. 4C, and adapt to five rows when the relevant input characteristics are detected. As a consequence, the adaption described can adapting from any presentation arrangement to any other presentation arrangement where the items are arranged in a different relative position to each other as a result of the activation characteristics of a single physical or virtual control which controls the scrolling action of a set of data. Further, with the interface 400, an initial arrangement may be that of FIG. 4A, and after the activation characteristic is first encountered, the arrangement may change to that of FIG. 4C. If scrolling continues and if the activation characteristic is again encountered (eg. the mouse switch 632 remains depressed), the arrangement may change to that of FIG. 4B. Any number of intermediate stages may be used.

Figure 5A:
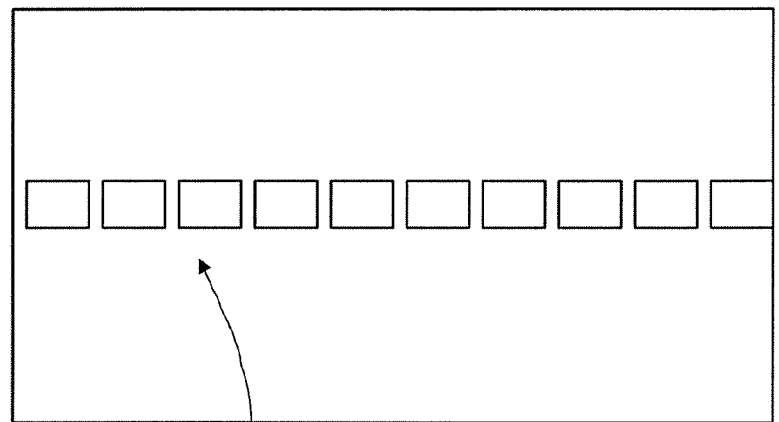
FIGS. 5A-5G are examples of a third interface and variations thereon.
Figure 5B:
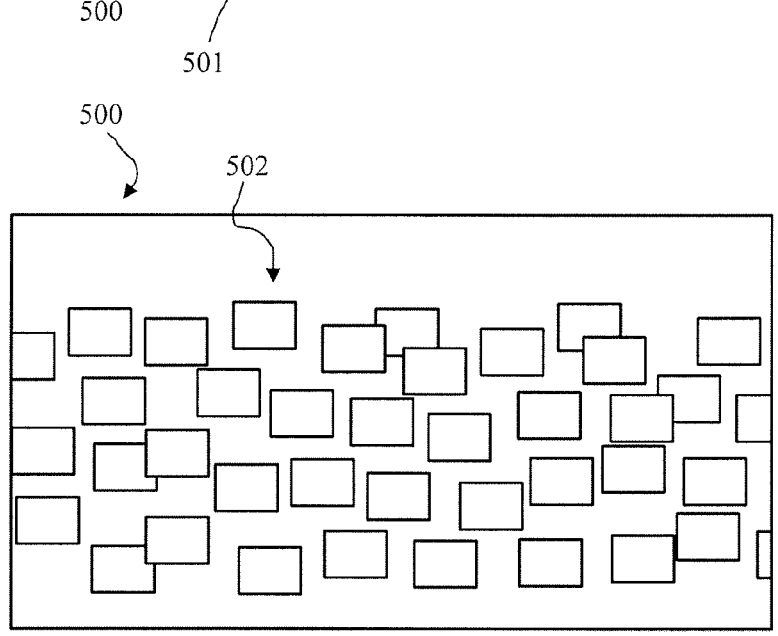
Figure 5C:
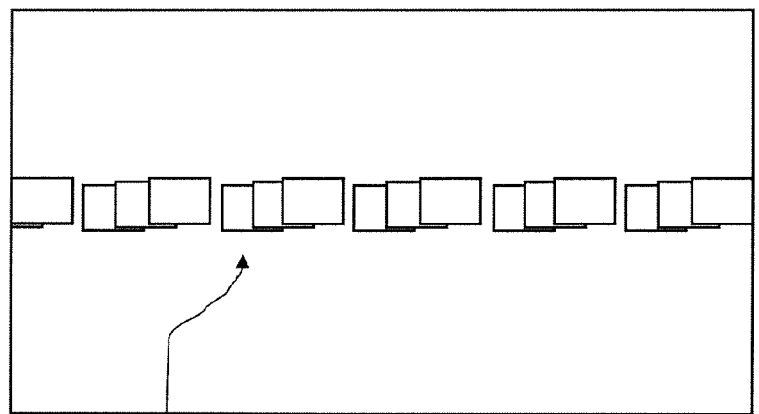
Figure 5D:
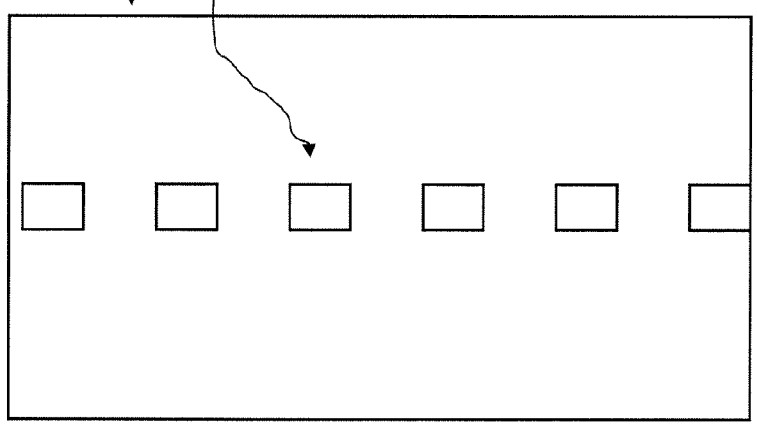
Figure 5E:
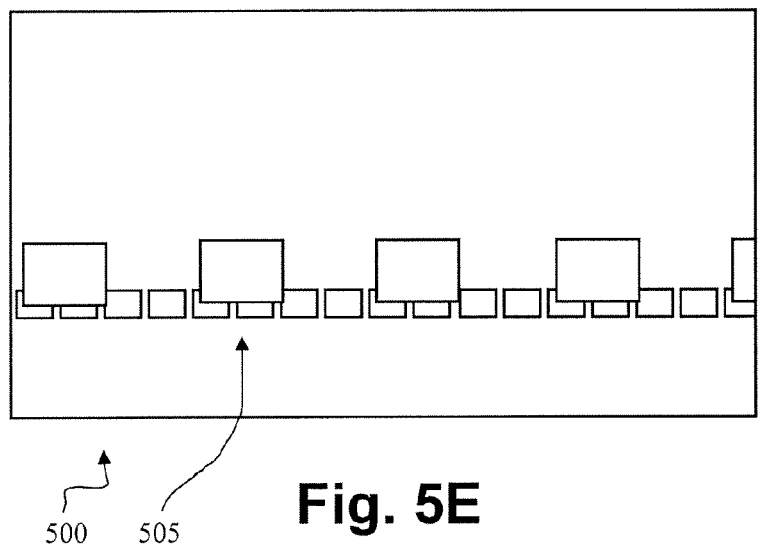
Figure 5F:
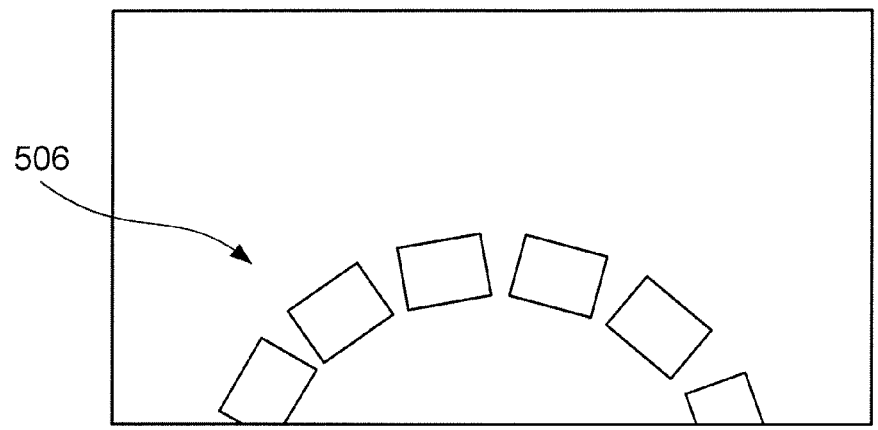
Figure 5G:
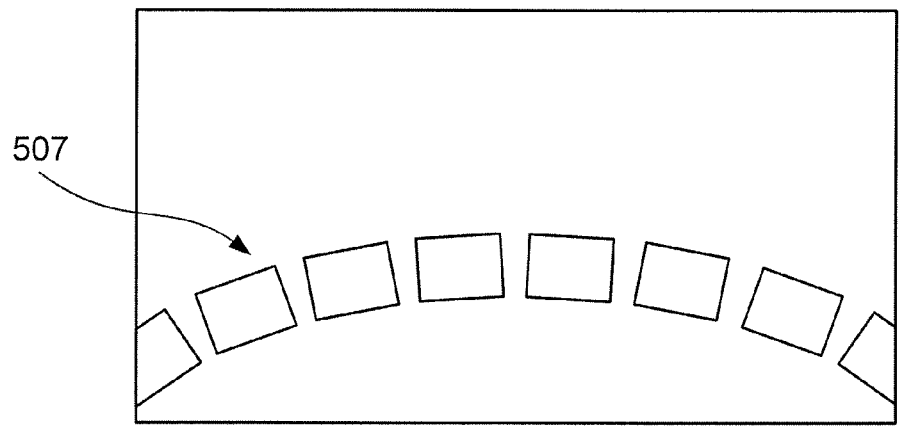

The change in relative spatial arrangement can be configured in many different ways. For example FIG. 5A shows an interface 500 having a single row 501 of items which can be adapted to a range of different arrangements as show in FIGS. 5B to 5E. In the interfaces 300 and 400, when in each of the first and second arrangements (and excepting any animated transition there between), the items are all evenly spaced. However the items may be unevenly spaced and such spacing may change from one arrangement to the other. FIG. 5B shows a randomised arrangement 502 of items where the items are unevenly spaced both vertically and horizontally in the viewing window. FIG. 5C shows the items clustered into overlapping stacks. FIG. 5D shows items in a spaced apart arrangement 504 which can help with distinguishing individual items at high speed. FIG. 5E shows items in an arrangement 505 in which some items are displayed at sizes substantially larger than others. This approach may be attractive where items such as photographs arranged chronologically relate to specific occasions and the larger representations act a key frames permitting the user better opportunity to assess their content. Another possibility is to adapt the alignment of items as shown in FIG. 5F where a first alignment to a curve is used in an initial arrangement 506 of items at a first scrolling speed and in FIG. 5G a second alignment 507 is used to arrange items at a second scrolling speed. All the arrangements of FIGS. 5B to 5E show different relative spatial arrangements to that shown in FIG. 5A, and FIG. 5G shows a different relative spatial arrangement to both FIGS. 5A and 5F. Other possibilities are available within the scope of the present disclosure.

Figure 4D:
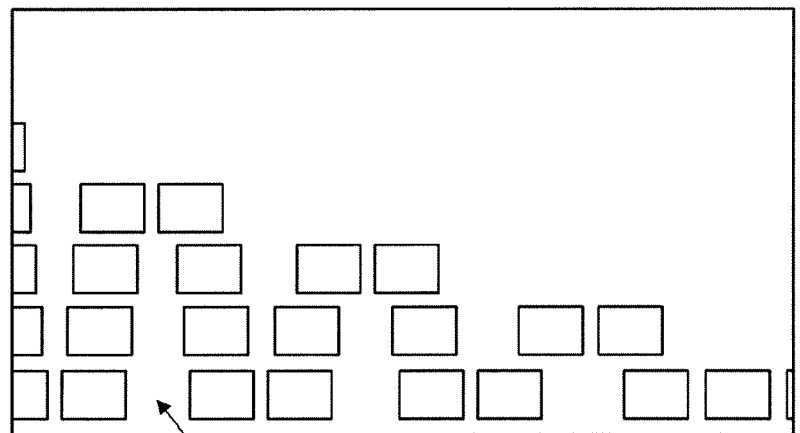
Figure 4E:
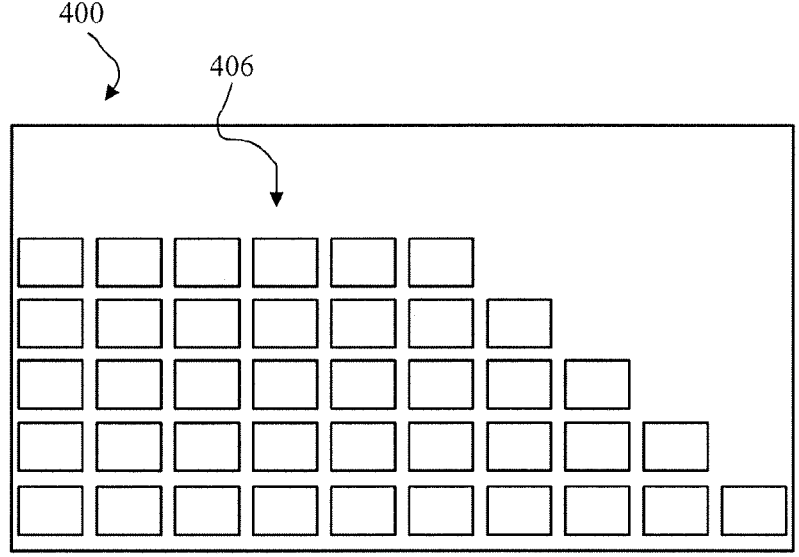

During the adaptation from a first arrangement to a second arrangement, any of a variety of reconfiguration options can be used. FIG. 4D shows an intermediate stage 405 of the interface 400 in an adaptation animation scrolling left to right wherein the sequence of items is adapted in a curling pattern which gradually increases in height to a wider presentation (having 5 rows, such as FIG. 4B) from a serial arrangement (a single row, such as FIG. 4A). FIG. 4E shows an alternate intermediate stage 406 of the interface 400 in an adaptation animation scrolling left to right wherein subsequent columns have greater numbers of items. Other possibilities include using fluid dynamics to control the flow of items from a narrow to a wide channel.

The presently disclosed interfaces 300, 400 and 500 may also be configured to function in a reverse process fashion wherein user input returns the presentation of the list of items to the previous arrangement. The user input could be the cessation of the activation characteristics used to initiate the adaptation to the second arrangement. In some implementations there may be other controls which can be activated to cancel the effect of the control used to scroll the images in one direction and to adapt the presentation. For example, in some implementations there may be a control to scroll in one direction and a separate control to scroll in the opposite direction (eg. left/up and right/down arrow keys on the keyboard 602). Activating the opposite control would cause the scrolling items to adapt back (revert) to a previous presentation, or slow to a stop (cause a cessation of scrolling), or both. Specific implementations may have a dedicated control which stops scrolling immediately and this control may also immediately change the presentation arrangement of items to the initial arrangement.

In a further implementation, items in the first arrangement are aligned to a curve with a first radius and items in the second arrangement are aligned to a curve with different radius. This form of representation may be used to provide circular or cylindrical viewing configurations, which may also have rows and columns and where scrolling is visually effect by rotating the cylindrical representation of the rows and columns.

Figure 8A:
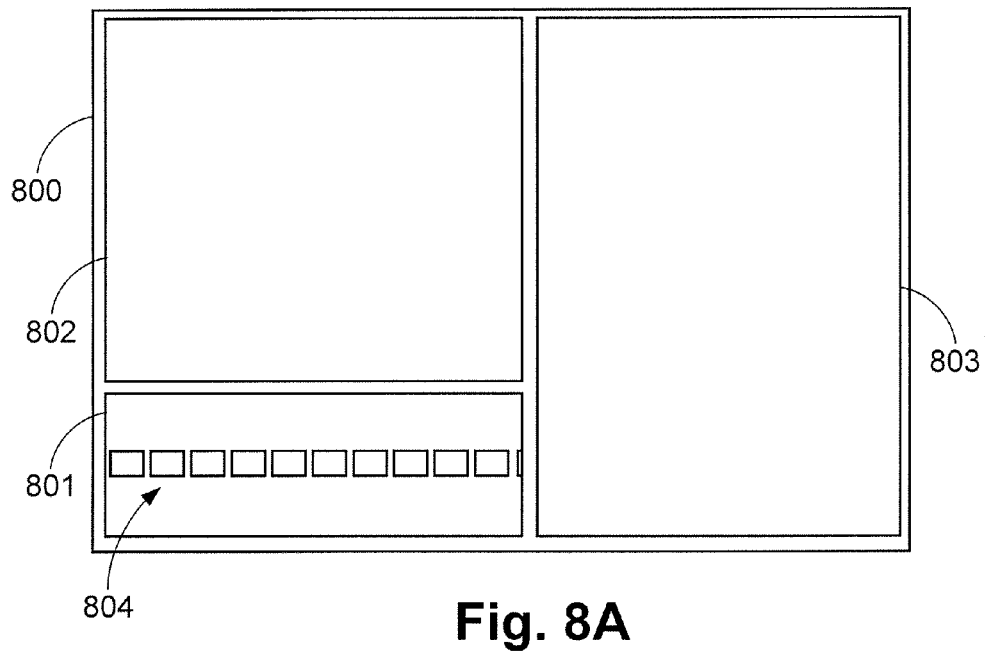
FIGS. 8A and 8B are examples of how window size may be varied with the manner of scrolling.
Figure 8B:
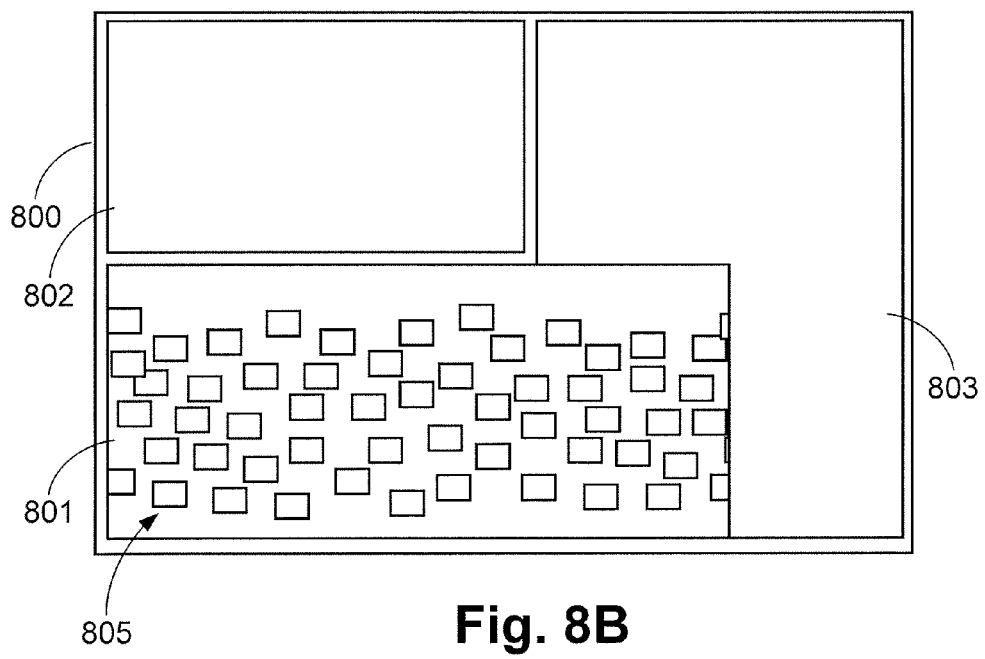

As a further alternative, the detection of the predetermined characteristic of user action may be used to automatically, and without additional user action, modify the size of the viewing window. For example as shown in FIG. 8A a viewing window 801 is shown in a viewing area 800. The viewing area also shows other areas 802 and 803 for information display. The viewing window 801 may commence as a film strip of thumbnail images 804 and as scrolling progresses past the trigger for the predetermined characteristic, the window 801 can grow in size as more items are displayed simultaneously in a scrolling fashion. FIG. 8B shows an arrangement where the scrolling thumbnail images are displayed in a more dense presentation 805 and the viewing window 801 has grown in size. The area 802 has adapted in size to accommodate the larger window 801. The viewing area 803 is occluded due to the larger viewing area 801. As the predetermined characteristic ceases (eg. the user releases the mouse button) the viewing window 801 may then collapse to its original film strip form having a single row of items.

Figure 7:
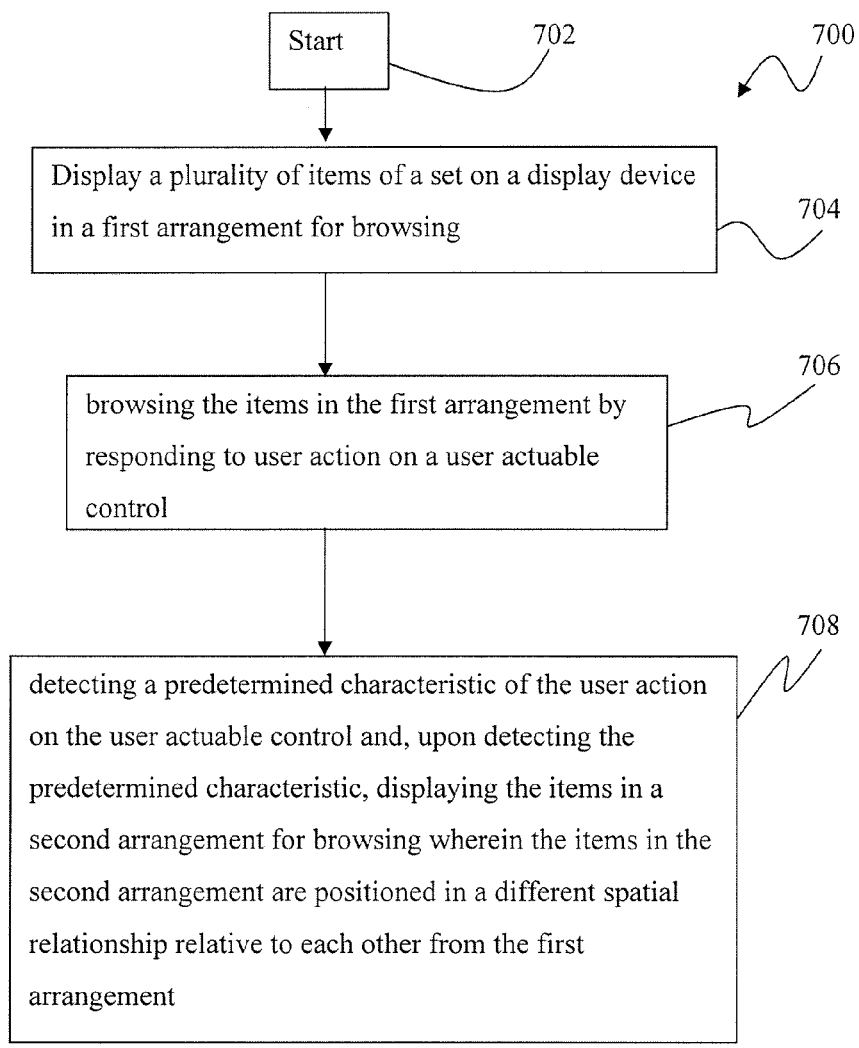
FIG. 7 is a flowchart of operating a interface for a method of browsing.

FIG. 7 shows a flowchart of a generalised method 700 for browsing a set of items on a display device. The method 700 is typically implemented by a computer device as discussed above and may be a subprogram having an entry step 702. In a following step 704, the method 700 via the user interface displays a plurality of items of the set on a display device in a first arrangement for browsing. The first arrangement may for example be that of FIG. 3A. In a next step 704, the user is able to browse the items in the set, by scrolling for example whilst maintaining display in the first arrangement by responding to user action on a user actuable control. This may be equivalent to that shown in FIG. 3B. In a next step 706, the method 700 detects a predetermined characteristic of the user action on the user actuable control and, upon detecting the predetermined characteristic, the method 700 operates to display the items in the user interface in a second arrangement for browsing wherein the items in the second arrangement are positioned in a different spatial relationship relative to each other from the first arrangement. An example of the second arrangement may be that of FIG. 3D. Displaying a transition, such as that shown in FIG. 3C, may also form an intermediate part of the method 700.

Figure 9:
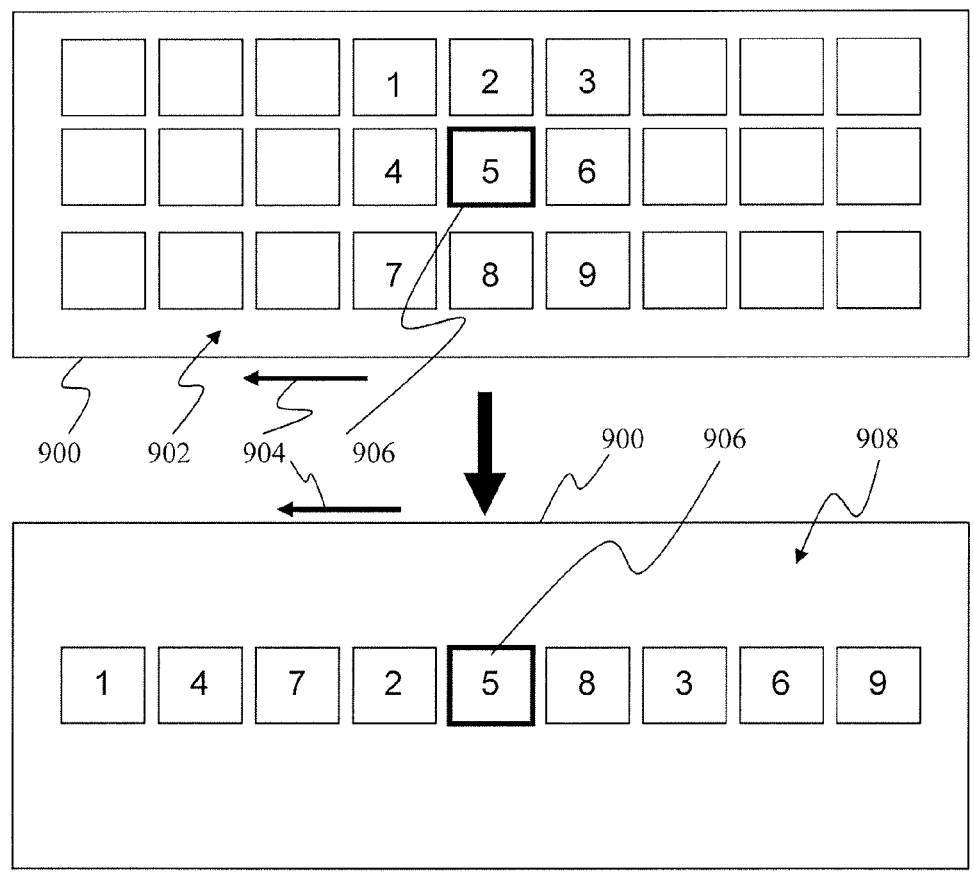
FIG. 9 shows how interfaces according to the present disclosure may revert from a multi-line arrangement to a single line arrangement.

FIG. 9 shows a manner in which interfaces according to the present disclosure may revert from a multi-line (or grid) arrangement, to a single line (filmstrip arrangement). A viewing window 900 shows a first arrangement 902 of thumbnail images which are being scrolled in a direction of scroll as indicated by an arrow 904. This arrangement may be one arrived at after a predetermined characteristic has been met, resulting in an increased flow rate of images. As illustrated, a number of the images are identified by a corresponding numeral 1, 2 . . . 9. At a moment of the predetermined characteristic no longer being met (eg. the user releasing a scroll button), the image occupy the various locations indicated with a certain image (image #5) being in a focus position 906, indicated by a thickened boarder. According to the present example, as the predetermined characteristic is no longer met, the representation 902 reverts to a representation 908 within the window 900 in which the certain image (#5) is retained in the focus position 906, in this case which maintains a central location in the window 900 regardless of the representation 902 or 906. In this specific example, the image items surrounding the focus item 906 in the representation 902 are then moved and rearranged using animation (not illustrated) to occupy the locations indicated in the representation 908. In this fashion the contextual relationship between the items displayed is maintained and the user has a stable reference in the item occupying the focus location 906. The focus location may be said to by occupied by a pivot item, in that other displayed items of the collection pivot on the item when the change in representation occurs. In this example, the row containing the pivot item is kept as a pivot row. One way to rearrange the multiple row into a single row is to animate the other images in that pivot row to the left and right, and also to animate the other row images around their closest images in the pivot row.

INDUSTRIAL APPLICABILITY

The interface arrangements presently described are applicable to the computer and data processing industries, and particularly where collections of data items, such as photographs, are required to scanned, or searched essentially manually relying upon user recognition of the representation of the items to identify items of interest.

The foregoing describes only some embodiments of the present invention, and modifications and/or changes can be made thereto without departing from the scope and spirit of the invention, the embodiments being illustrative and not restrictive. For example, whilst the interfaces 300, 400 and 500 are described primarily as relating to rows of items, similar approaches may focus attention upon the management and variation of columns of items. Other configurations may also be used. Further, whilst the description of the interfaces of FIGS. 3A-5E has made reference predominantly to a user actuable control being a mouse pointer or associated graphical icons/tools, such control may also be implemented in a wide variety of other ways such as via keys of the keyboard 602, or by keys of a keypad of the remote control device 105 of FIG. 1. Other controls may also be used such as circular finger pads found on some portable devices, movement sensitive devices such as accelerometers, pressure sensitive devices such as strain gauges, and temperature sensitive devices such as thermocouples which can detect changes in temperature for example caused by finger pressure.

I claim:

1. A method of browsing a set of items on a display device via scrolling, the method comprising steps of:
   displaying on the display device a plurality of items of the set of items in a first arrangement for browsing, the first arrangement displaying the plurality of items in at least one line and being associated with a current scrolling direction and a current scrolling speed;
   receiving, associated with the first arrangement, a scrolling instruction associated with an increased scrolling speed relative to the current scrolling speed and the current scrolling direction to scroll the set of items; and
   changing a display configuration of the set of items from the first arrangement to a second arrangement in response to the received scrolling instruction, to scroll the set of items at the current scrolling speed instead of the increased scrolling speed, such that, in the second arrangement, a number of lines in which items of the set of items are displayed is increased compared to the first arrangement, the number of lines being increased in a direction orthogonal to the current scrolling direction while maintaining a size of the displayed items, to thereby display more items of the set of items in the second arrangement than in the first arrangement, each of the lines in the second arrangement having a plurality of items of the set of items and being scrolled at the current scrolling speed and in the current scrolling direction, such that the changing step causes a bandwidth of the second arrangement to be higher than a bandwidth of the first arrangement to allow a user to scroll through more items of the set of items in a shorter time without a need to increase the current scrolling speed.

2. A method according to claim 1, wherein the scrolling instruction includes a continuous actuation of a user actuable control.

3. A method according to claim 1, wherein the scrolling instruction includes a continuous actuation for a predetermined period of time of a user actuable control.

4. A method according to claim 1, wherein a characterization of the scrolling instruction is selected from a group that includes: repeated instances of the scrolling instruction, repeated instances of the scrolling instruction within a predetermined period of time, and repeated instances of the scrolling instruction followed by a pause of a predetermined amount of time.

5. A method according to claim 1, wherein a characterization of the scrolling instruction is selected from a group that includes: a changed intensity of the scrolling instruction and cessation of the scrolling instruction.

6. A method according to claim 5, wherein a characterization of the scrolling instruction is selected from a group that includes: a speed of rotation of a user actuable control, an amount of force applied to the user actuable control, and a proximity associated with the user actuable control.

7. A method according to claim 1, wherein the first arrangement includes at least one row of items and the second arrangement has a different number of rows from the first arrangement.

8. A method according to claim 1, wherein the first arrangement includes at least one column of items and the second arrangement has a different number of columns from the first arrangement.

9. A method according to claim 1, wherein the second arrangement has a different flow rate of items from the first arrangement.

10. A method according to claim 1, wherein items in the first arrangement are aligned to a curve with a first radius and items in the second arrangement are aligned to a curve with a second radius that is different from the first radius.

11. A method according to claim 1, wherein items in the first arrangement are one of being evenly spaced and being unevenly spaced and items in the second arrangement are the other of being evenly spaced and being unevenly spaced.

12. A method according to claim 1, wherein the set of items are displayed on the display device in a display window and a size of the display window remains unaltered for each of the first arrangement and the second arrangement.

13. A method according to claim 1, wherein the set of items are displayed on the display device in a display window and a size of the display window is different in the first arrangement from the second arrangement.

14. A method according to claim 13, wherein the size of the display window varies with continuous or continued actuation of a user actuable control.

15. A method according to claim 14, wherein the size of the display window increases with continuous or continued actuation of the user actuable control and decreases with cessation of such actuation.

16. A non-transitory computer-readable storage medium having a computer program recorded thereon for implementing a method executable in a computing device of browsing a set of items displayable on a display device via scrolling, the method comprising steps of:
   displaying on the display device a plurality of items of the set of items in a first arrangement for browsing, the first arrangement displaying the plurality of items in at least one line and being associated with a current scrolling direction and a current scrolling speed;
   receiving, associated with the first arrangement, a scrolling instruction associated with an increased scrolling speed relative to the current scrolling speed and the current scrolling direction to scroll the set of items; and
   changing a display configuration of the set of items from the first arrangement to a second arrangement in response to the received scrolling instruction to scroll the set of items at the current scrolling speed instead of the increased scrolling speed, such that, in the second arrangement, a number of lines in which items of the set of items are displayed is increased compared to the first arrangement, the number of lines being increased in a direction orthogonal to the current scrolling direction while maintaining a size of the displayed items, to thereby display more items of the set of items in the second arrangement than in the first arrangement, each of the lines in the second arrangement having a plurality of items of the set of items and being scrolled at the current scrolling speed and in the current scrolling direction, such that the changing step causes a bandwidth of the second arrangement to be higher than a bandwidth of the first arrangement to allow a user to scroll through more items of the set of items in a shorter time without a need to increase the current scrolling speed.

17. A computer apparatus for browsing a set of items on a display device via scrolling, the apparatus comprising a processor programmed to:

cause the display device to display a plurality of items of the set of items in a first arrangement for browsing, the first arrangement displaying the plurality of items in at least one line;

enable browsing of items displayed in the first arrangement at a current scrolling speed in a current scrolling direction by responding to user action on a user actuable control;

receive, associated with the first arrangement, a scrolling instruction associated with an increased scrolling speed relative to the current scrolling speed and the current scrolling direction to scroll the set of items displayed; and cause the display device to display, in response to the received scrolling instruction, a plurality of items of the set of items in a second arrangement to scroll the set of items at the current scrolling speed instead of the increased scrolling speed, such that, in the second arrangement, a number of lines in which items of the set of items are displayed is increased compared to the first arrangement, the number of lines being increased in a direction orthogonal to the current scrolling direction while maintain a size of the displayed items, to thereby display more items of the set of items in the second arrangement than in the first arrangement, each of the lines in the second arrangement having a plurality of items of the set of items and being scrolled at the current scrolling speed such that a bandwidth of the second arrangement is higher than a bandwidth of the first arrangement to allow a user to scroll through more items of the set of items in a shorter time compared to the first arrangement without a need to increase the current scrolling speed.

* * * * *